June 25, 1963  A. HOYLER  3,094,734
WINDSHIELD WIPER
Filed Nov. 27, 1959  2 Sheets-Sheet 1

INVENTOR
Alfred Hoyler
by Michael S. Striker
Attorney

June 25, 1963  A. HOYLER  3,094,734
WINDSHIELD WIPER
Filed Nov. 27, 1959  2 Sheets-Sheet 2

INVENTOR
Alfred Hoyler
by
Michael S. Striker
Attorney

# United States Patent Office 3,094,734
Patented June 25, 1963

3,094,734
WINDSHIELD WIPER
Alfred Hoyler, Buhlertal, Baden, Germany, assignor to Robert Bosch G.m.b.H., Stuttgart, Germany
Filed Nov. 27, 1959, Ser. No. 855,732
Claims priority, application Germany Dec. 4, 1958
5 Claims. (Cl. 15—250.42)

The present invention relates to windshield wipers.

More particularly, the present invention relates to windshield wiper blade constructions.

It is an object of the present invention to provide a windshield wiper having a reinforced blade which is so constructed that there is no metallic contact between the reinforcement and the parts which hold the blade.

It is another object of the present invention to provide a windshield wiper which is so constructed that no metallic part will ever touch the windshield being wiped.

The objects of the present invention further include the provision of a windshield wiper which is of sturdy construction, which may be mass-produced at low cost, and which will give long periods of trouble-free service.

With the above objects in view, the present invention mainly resides in a windshield wiper incorporating an elongated wiper blade having a rear beam portion, a protecting beam portion on each side of the blade, and supporting beam means on each side of the blade. The supporting beam means are arranged intermediate the rear beam portion and the protective beam portion on the corresponding side of the blade and are located at least at those points along the length of the blade at which the blade is engaged by holding claws.

More particularly, the present invention resides in that combination which incorporates the above-described blade as well as holding means whose claws encompass the supporting beam means. The rear beam portion and each supporting beam means form between themselves an elongated groove, and a reinforcement is arranged in each of these grooves. The width of each reinforcement is less than the depth of the groove within which it is arranged so that physical contact between the claw means and the reinforcements is prevented. Also, the reinforcements are shorter than the grooves within which they are arranged, so that the end portion of the blades are free of reinforcements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
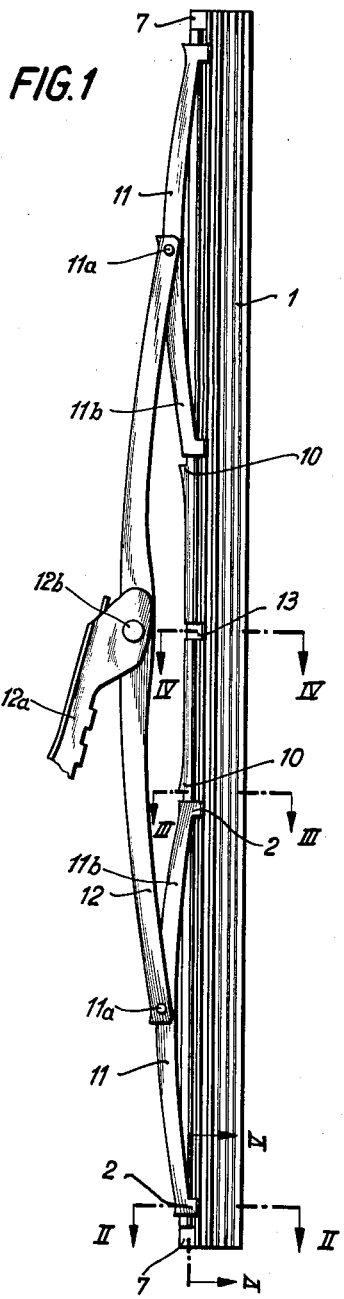
FIG. 1 is a side elevational view of a windshield wiper according to the present invention.
Figure 2:
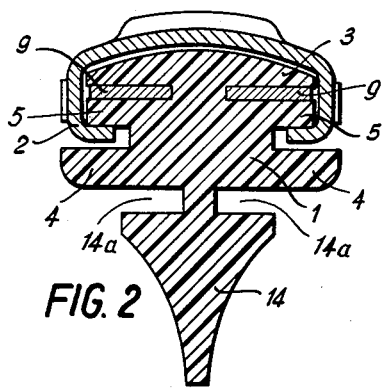
FIG. 2 is a sectional view taken on line II—II of FIG. 1.
Figure 4:
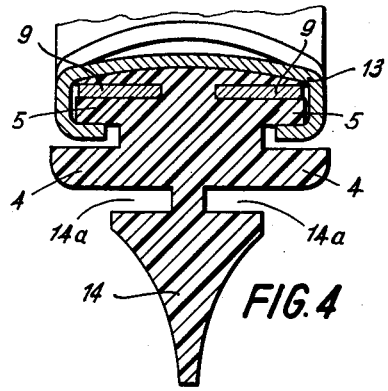
FIG. 4 is a sectional view taken on line IV—IV of FIG. 1.
Figure 3:
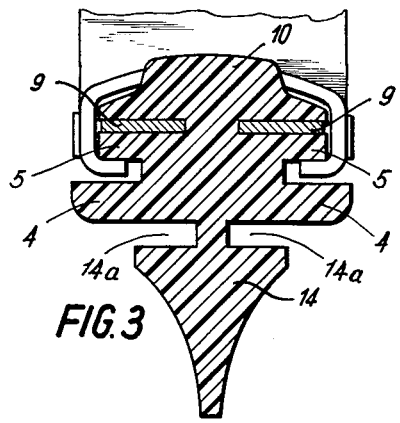
FIG. 3 is a sectional view taken on line III—III of FIG. 1.

Referring now to the drawings and to FIGS. 1 to 5 thereof in particular, there is shown a windshield wiper incorporating an elongated rubber wiper blade 1 and holding means in the form of two metallic, elongated and slightly arched holding members 11 which are coextensive with the end portions of the blade and which have at their ends claws 2 for holding the blade at four spaced points along its length. The holding members 11 are pivotally connected at 11a to the ends of an elongated arched connecting member 12, and the latter is pivotally connected to a wiper arm by a connector 12a pivotally connected to the member 12 at 12b. The wiper arm is driven back and forth by a suitable mechanism (not shown) well known in the art.

The wiper blade 1 has a rear beam portion 3 as well as a protective beam portion 4 arranged on each side. The protective beam portions form the widest part of the profile of the blade so that even if the blade assumes a tilted position there is no danger of any metal parts touching the windshield. In this way, the windshield will not be scratched by the metal parts.

The blade 1 also has supporting beam means 5 on each side of the blade. These means 5 are arranged intermediate the rear beam portion 3 and the protective beam portion 4 on the corresponding side of the blade, and extend at least at those points along the length of the blade at which the blade is engaged by the claws 2. Here it will be noted that the protective beam portion 4 need be provided only at those portions at which the means 5 of the blade are encompassed by the claws 2 (and by the claw 13, to be described later), but may, as shown in the drawings, extend throughout the entire length of the blade. In that case, there is formed between each protective beam portion 4 and the actual wiper lip 14 of the blade an elongated groove 14a which extends throughout the entire length of the blade.

According to the present invention, the blade 1 is reinforced with two elongated reinforcing springs 9 made of steel or other metal. These springs 9 are received in elongated grooves which the supporting beam means 5 and the rear beam portion 3 form between each other. As is clearly shown in the drawings, the width of the reinforcement springs 9 is less than the depth of the grooves within which they are arranged, so that physical contact between the reinforcement springs 9 and the claws 2 is prevented, thus avoiding metal-to-metal contact. The end portions 8 of the springs 9 are received in closed pockets 7a, so that with the springs 9 being shorter than the grooves within which they lie, the end portions 7 of the blade 1 are free of reinforcements. The pockets 7a are located close to the dorsal line of the blade, i.e., they are near the surface of the rear beam portion 3.

Figure 7:
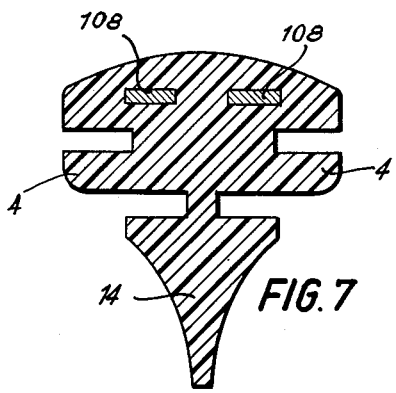
FIG. 7 is a sectional view taken on line VII—VII of FIG. 6.
Figure 5:
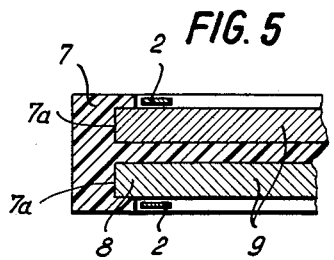
FIG. 5 is a sectional view taken an line V—V of FIG. 1.
Figure 6:
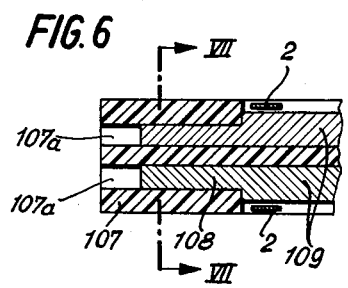
FIG. 6 is a sectional view corresponding to that of FIG. 5 but illustrates a modified embodiment of the present invention.

If desired, the end portions 107 of the blade may be open as shown at 107a in FIGS. 6 and 7, and the reduced end portions 108 of the reinforcement springs 109 are received in these open ends. It will be noted that here, too, the reinforcement springs are shorter than the blade itself so that the end portions of the blade are likewise free of reinforcements and no metallic part protrudes beyond the ends of the blade.

If the blade is relatively long, it may be advisable to provide one or more additional clamps or claws 13 for securing the reinforcements 9. These additional claws, only one of which is shown, are independent of the above-described holding means but also encompass the support beam means 5. In order to prevent longitudinal displacement of the claw 13, it is seated in an appropriately shaped recess formed in the rear beam portion 3.

The blade is also formed with abutment means 10 arranged on the rear beam portion 3 for engaging those end portions of the holding members 11 which are directed toward the center of the blade, namely, the end portions 11b, so as to prevent movement of the holding members 11b toward the center. In this way, the blade cannot slip out of the claws 2 of the holding members 11. These abutment means may either be integral with the wiper blade, or they may be made of separate pieces which are subsequently fastened to the blade in any suitable manner.

It will be seen from the above that according to the present invention the reinforcement springs are so embedded so they cannot contact the holding members 11 or their claws 2, thereby preventing all metal-to-metal contact within the blade. At the same time, the arrangement of the parts is such that the grooves within which the holding claws are received are not as deep as those within which the reinforcements are located, so that the blade is not unnecessarily weakened. Also, due to the fact that the reinforcements are shorter than the blade itself, they cannot protrude beyond the ends of the blade so that here, too, no metal-to-metal contact is possible. Furthermore, the arrangement of the parts is such that thanks to the protective beam portion 4 no metal part of the windshield wiper can touch the surface of the windshield being wiped. Also, thanks to the above-described abutment means the holding members are prevented from moving relative to the blade proper, so that even if the wiper is used for sharply curved windshields, there will be no chattering or rattling of metallic parts against each other.

It will also be seen that all of the above advantages are obtained while maintaining the construction of the blade extremely simple, so that it can be manufactured and mass-produced at low cost.

It will be understood that each of the elements described above, or two or more together, may also find a useful application in other types of wiper blades differing from the types described above.

While the invention has been illustrated and described as embodied in a windshield wiper construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a windshield wiper, the combination which comprises an elongated wiper blade and claw means for holding said blade at spaced points along its length, said wiper blade having a rear beam portion, a protective beam portion on each side of said blade, and supporting beam means on each side of said blade, said supporting beam means being arranged intermediate said rear beam portion and the protecting beam portion on the corresponding side of said blade and being located at least at those points along the length of said blade at which said claw means engage said blade by encompassing said supporting beam means, said rear beam portion and each of said supporting beam means forming between themselves an elongated groove having an open outer side and an elongated flat reinforcement arranged in each of said grooves, the width of each reinforcement being less than the depth of the groove within which it is arranged and each reinforcement being at least slightly spaced inwardly from the open side of the respective groove whereby physical contact between said claw means and said reinforcements is prevented, and each groove and the respective reinforcement being shorter than said blade whereby the end portions of said blade are free of said reinforcements.

2. In a windshield wiper, the combination which comprises an elongated wiper blade and claw means for holding said blade at spaced points along its length, said wiper blade having a rear beam portion, a protective beam portion on each side of said blade, and supporting beam means on each side of said blade, said supporting beam means being arranged intermediate said rear beam portion and the protecting beam portion on the corresponding side of said blade and being located at least at those points along the length of said blade at which said claw means engage said blade by encompassing said supporting beam means, said rear beam portion and each of said supporting beam means forming between themselves an elongated groove having an open outer side, an elongated flat reinforcement arranged in each of said grooves, the width of each of said reinforcements being less than the depth of the groove within which it is arranged and each reinforcement being at least slightly spaced inwardly from the open side of the respective groove so that physical contact between said claw means and said reinforcements is prevented, and at least one additional claw means independent of said claw means for holding said blade, said additional claw means also encompassing said supporting beam means.

3. In a windshield wiper, the combination which comprises an elongated wiper blade and claw means for holding said blade at spaced points along its length, said wiper blade having a rear beam portion, a protective beam portion on each side of said blade, and supporting beam means on each side of said blade, said supporting beam means being arranged intermediate said rear beam portion and the protecting beam portion on the corresponding side of said blade and being located at least at those points along the length of said blade at which said claw means engage said blade by encompassing said supporting beam means, said rear beam portion and each of said supporting beam means forming between themselves an elongated groove having an open outer side, an elongated flat reinforcement arranged in each of said grooves, the width of said reinforcements being less than the depth of the groove within which it is arranged and each reinforcement being at least slightly spaced inwardly from the open side of the respective groove so that physical contact between said claw means and said reinforcements is prevented, and at least one additional claw means independent of said claw means for holding said blade, said additional claw means being seated in a recess formed in said rear beam portion and also encompassing said supporting beam means.

4. In a windshield wiper, the combination which comprises an elongated wiper blade and holding means comprising two elongated holding members which are coextensive with the end portions of said blade, each of said holding members having at its end claw means for holding said blade at four spaced points along its length, said wiper blade having a rear beam portion, a protective beam portion on each side of said blade, and supporting beam means on each side of said blade, said supporting beam means being arranged intermediate said rear beam portion and the protecting beam portion on the corresponding side of said blade and being located at least at those points along the length of said blade at which said claw means engage said blade by encompassing said supporting beam means, said rear beam portion and each of said supporting beam means forming between themselves an elongated groove, and an elongated flat reinforcement arranged in each of said grooves, the width of each reinforcement being less than the depth of the groove within which it is arranged whereby physical contact between said claw means and said reinforcements is prevented, and said blade being formed with abutment means arranged on said rear beam portion for engaging those end portions of said holding members which are directed toward the center of said blade so as to prevent movement of said holding members toward said center.

5. In a windshield wiper, the combination which comprises an elongated wiper blade and holding means comprising two elongated holding members which are coextensive with the end portions of said blade, each of said holding members having claw means for holding said blade at a plurality of spaced points along its length, said wiper blade having a rear beam portion, a protective beam portion on each side of said blade, and supporting beam means on each side of said blade, said supporting beam means being arranged intermediate said rear beam portion and the protecting beam portion on the corresponding side of said blade and being located at least at those points along the length of said blade at which said claw means engage said blade by encompasisng said supporting beam means, said rear beam portion and each of said supporting beam means forming between themselves an elongated groove, and an elongated flat reinforcement arranged in each of said grooves, the width of each reinforcement being less than the depth of the groove within which it is arranged whereby physical contact between said claw means and said reinforcements is prevented, and said blade being provided with abutment means engaging said holding members so as to prevent movements of the holding members with respect to the blade.

References Cited in the file of this patent

UNITED STATES PATENTS

| | | |
|---|---|---|
| 2,741,791 | Scinta | Apr. 17, 1956 |
| 2,782,443 | Krohm | Feb. 26, 1957 |
| 2,861,289 | Nesson | Nov. 25, 1958 |
| 2,907,065 | Macpherson | Oct. 6, 1959 |
| 2,925,615 | Krohm | Feb. 23, 1960 |